(12) United States Patent
Kiyoto et al.

(10) Patent No.: US 7,522,591 B2
(45) Date of Patent: Apr. 21, 2009

(54) POLICY SETTABLE PEER-TO-PEER SESSION APPARATUS

(75) Inventors: Satoshi Kiyoto, Fujisawa (JP); Kenichi Sakamoto, Kawasaki (JP); Kazuma Yumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 788 days.

(21) Appl. No.: 10/689,695

(22) Filed: Oct. 22, 2003

(65) Prior Publication Data
US 2004/0165587 A1    Aug. 26, 2004

(30) Foreign Application Priority Data
Oct. 23, 2002    (JP) .............................. 2002-307875

(51) Int. Cl.
    *H04L 12/28*    (2006.01)
(52) U.S. Cl. ......................... 370/389; 370/401; 709/238
(58) Field of Classification Search ................. 370/229, 370/230, 254, 352, 389, 400, 401, 405; 709/200–229, 709/238; 707/10
See application file for complete search history.

(56) References Cited

U.S. PATENT DOCUMENTS

| | | | |
|---|---|---|---|
| 6,434,153 B1 | 8/2002 | Yazaki et al. | |
| 6,970,930 B1* | 11/2005 | Donovan | 709/227 |
| 2002/0036983 A1* | 3/2002 | Widegren et al. | 370/230.1 |
| 2002/0041590 A1* | 4/2002 | Donovan | 370/352 |
| 2002/0145975 A1* | 10/2002 | MeLampy et al. | 370/235 |
| 2004/0109414 A1* | 6/2004 | Choi et al. | 370/230 |

FOREIGN PATENT DOCUMENTS

| | | |
|---|---|---|
| JP | 11112503 | 4/1999 |
| JP | 200186161 | 3/2001 |

* cited by examiner

*Primary Examiner*—Chirag G Shah
*Assistant Examiner*—Andrew C Lee
(74) *Attorney, Agent, or Firm*—Mattingly, Stanger, Malur & Brundidge, P.C.

(57) ABSTRACT

A session relay apparatus for preventing the packet relay delay by detecting the start and end of the policy settable peer-to-peer communication is disclosed. The session relay apparatus for relay a session control message transmitted and received between communication terminals to control the peer-to-peer communication detects the start and end of the communication from the session control message, and acquires the information for identifying a session and the information on the peer-to-peer communication carried out on the session. Upon generation of a policy indicating the packet relay control process by a policy generating unit, edge nodes for passing the packet are searched for and the policy is distributed to the edge nodes. The policy is set in the edge nodes accommodating the communication terminals at the start of communication, and the policy setting is canceled at the end of communication.

4 Claims, 10 Drawing Sheets

```
INVITE sip:UserB@192.168.100.20 SIP/2.0                              800
Via: SIP/2.0/UDP 192.168.10.1;branch=z9hG4bK352007m
From: <sip:UserA@192.168.100.10>;tag=111
To: <sip:UserB@192.168.100.20>
Call-ID: INV@UserA2B
CSeq: 1 INVITE
Contact: <sip:192.168.10.1>
Content-Type: application/sdp
```

```
  v=0                                                                801
  o=userA 2890844526 2890842807 IN IP4 192.168.10.1
  s=QoS enable P2P
  i=A Peer to Peer with Quality of Service Control
  u=http://www.example.com/userA/p2p.txt
  e=userA@                                                           810
  c=IN IP4 192.168.10.1
  t=2873397496 2873404696
  a=recvonly                                                         820
  m=audio 49170 RTP/AVP 0
```

FIG.5

| Call-ID | To tag | From tag | TRANSMITTER ADDRESS | TRANSMITTER PORT | DESTINATION ADDRESS | DESTINATION PORT | DSCP VALUE | RELAY NETWORK |
|---|---|---|---|---|---|---|---|---|
| INV@UserA2B | 946 | 111 | 192.168.10.1 | 49170 | 192.168.20.1 | 49171 | 0x001010 | — |
| ... | ... | ... | ... | ... | ... | ... | ... | ... |

| COMMUNICATION TERMINAL IP ADDRESS | EDGE NODE IP ADDRESS |
|---|---|
| 192.168.10.1 | 192.168.100.1 |
| ... | ... |

```
SIP/2.0 200 OK
Via: SIP/2.0/UDP 192.168.10.1;branch=z9hG4bK352007m
Via: SIP/2.0/UDP 192.168.100.10;branch=z9hG4bK3721532289
Via: SIP/2.0/UDP 192.168.10.020;branch=z9hG4bKaa92ca8
From: <sip:UserA@192.168.100.10>;tag=111
To: <sip:UserB@192.168.100.20>;tag=946
Call-ID: INV@UserA2B
CSeq: 1 INVITE
Contact: <sip:192.168.20.1>
Content-Type: application/sdp
```
— 900

```
v=0
o=userB 2890844526 2890842807 IN IP4 192.168.20.1
s=QoS enable P2P
i=B Peer to Peer with Quality of Service Control
u=http://www.example.com/userB/p2p.txt       — 910
e=userB@
c=IN IP4 192.168.20.1
t=2873397496 2873404696                       — 920
a=recvonly
m=audio 49171 RTP/AVP 0
```
— 901

POLICY SETTABLE PEER-TO-PEER SESSION APPARATUS

BACKGROUND OF THE INVENTION

The present invention relates to the peer-to-peer communication of one-to-one type, or in particular to a session relay apparatus in which the network operation policy for the relay nodes on the network can be set and canceled with the start or the end of the peer-to-peer communication as a motive.

The network operated and managed by a network provider such as a communication carrier or ISP (Internet Service Provider) is configured of a plurality of relay nodes interconnected for relay the user packets. In the network configured of the relay nodes, the network operation policy for controlling the route and the communication quality of the user packets is called simply as the policy. This policy is set for each application or each user in accordance with the priority or security of the packet relay operation. The relay nodes making up the network perform the process of relay the packets in accordance with the policy thus set.

The network has arranged therein a policy server for uniquely managing the policy, and this policy server reflects the policy in the network by distributing the policy to a multiplicity of relay nodes constituting the network. A well-known protocol for distributing the policy from the policy server is COPS (Common Open Policy Service) defined in the standard recommendation RFC (Request for Comments) prepared by IETF (Internet Engineering Task Force) and issued by IAB (Internet Architecture Board).

The network provider can set in a network, for example, a policy for priority control in which the packet of a specific user is repeated preferentially over the packets of the other users. In this case, the policy server classifies specific influent packets in the network into a plurality of priority control classes for the relay node called the edge node arranged in the network boundary, and distributes the policy for setting in the packet header the value called DSCP (Diffserv Code Point) corresponding to each priority control class. The edge node with this policy set therein determines whether the packets flowing into the network configured of the relay nodes meet the conditions set by the policy, and in the presence of a packet meeting the particular conditions, the DSCP value is set in the header of the packet in accordance with the priority control class assigned to the particular packet. Each relay node making up the network performs the priority control of the packets in accordance with the DSCP value set by the edge node.

An example of priority control of the packets with the DSCP value set by the edge node is described in JP-A-2000-253047. In the technique called Diffserv (Differentiated Services) described in this publication, the relay node called the core node arranged in the network transfers packets by priority control in accordance with the order of priority set in the DSCP value under the rules predetermined based on the DSCP value in the header of the received packet. This technique called Diffserv is used, as in the IP (Internet Protocol) telephone, to reduce the transfer delay in transmitting/receiving, on the IP network, the packets requiring the real time property such as audio packets and video packets.

In the peer-to-peer communication of one-to-one type like the IP telephone, on the other hand, a session is established between two communication terminals by a session control protocol typically including SIP (Session Initiation Protocol) defined in the standard recommendation RFC 3261, and the peer-to-peer communication conducted with real time data such as voice and image on the session thus established. The term "session" is defined as the period from the start to the end of the logical connection for communication executed between two communication terminals. Also, the term "peer-to-peer communication" is defined as a form of direct communication established between communication terminals without any server therebetween. In SIP, a session relay apparatus for relay the session control message searches for the terminal of the other party of communication, holds the information required for the peer-to-peer communication including the address of the communication terminal, the port number and the data number or otherwise executes the session management. The "session control message" repeated by the session control message is defined as a message transmitted or received prior to the start or end of the session between communication terminals.

In this peer-to-peer communication, the contents of the data transmitted and received between the communication terminals for each session may be different, include audio data or dynamic image data even in the communication between the same terminals. In such a case, packets are required to be repeated with the proper policy in accordance with the contents of the data, i.e. the contents of the communication. In the case where the network policy is controlled by the policy server as described above, the start and end of the peer-to-peer communication cannot be detected by the policy server, and therefore, the operator of the policy server is required to set the proper policy in accordance with the contents of the communication for the edge nodes in accordance with the start and end of the peer-to-peer communication. In this method, however, an increased network size requires frequent policy setting process, and therefore the setting by the operator may fail to meet the requirements.

In the method for setting in the edge nodes all the policies on the communication terminal for the peer-to-peer communication, on the other hand, the search process for the conditions of classification of the policy control in the edge nodes increases with the increase in the network scale. The increased search process imposes a processing burden on the edge nodes, resulting in an increased packet relay delay for real-time packets.

SUMMARY OF THE INVENTION

Accordingly, an object of the present invention is to provide a policy settable peer-to-peer session relay apparatus, which detects the start and end of the peer-to-peer communication between communication terminals, and sets or cancels the policy for the edge node containing each communication terminal. As a result, the operator is not required to perform the policy setting operation, and the packet relay delay at the edge nodes otherwise caused by the unrequired policy setting process is prevented.

Specifically, there is provided a session relay apparatus, wherein each relay node includes a mechanism for establishing a session between communication terminals, a mechanism for generating a policy and a mechanism for distributing the policy generated, thereby making it possible to generate and distribute a policy in accordance with the establishment of a session.

The above and other objects, features and advantages will be made apparent by the detailed description taken in conjunction with the accompanying drawings.

DETAILED DESCRIPTION OF THE EMBODIMENTS

An embodiment of the invention is explained below with reference to a case in which SIP is used as a peer-to-peer communication session control protocol and COPS as a policy distribution protocol. In embodying the invention, the session control protocol is not limited to SIP, and the policy distribution protocol other than COPS may be used.

Figure 1:
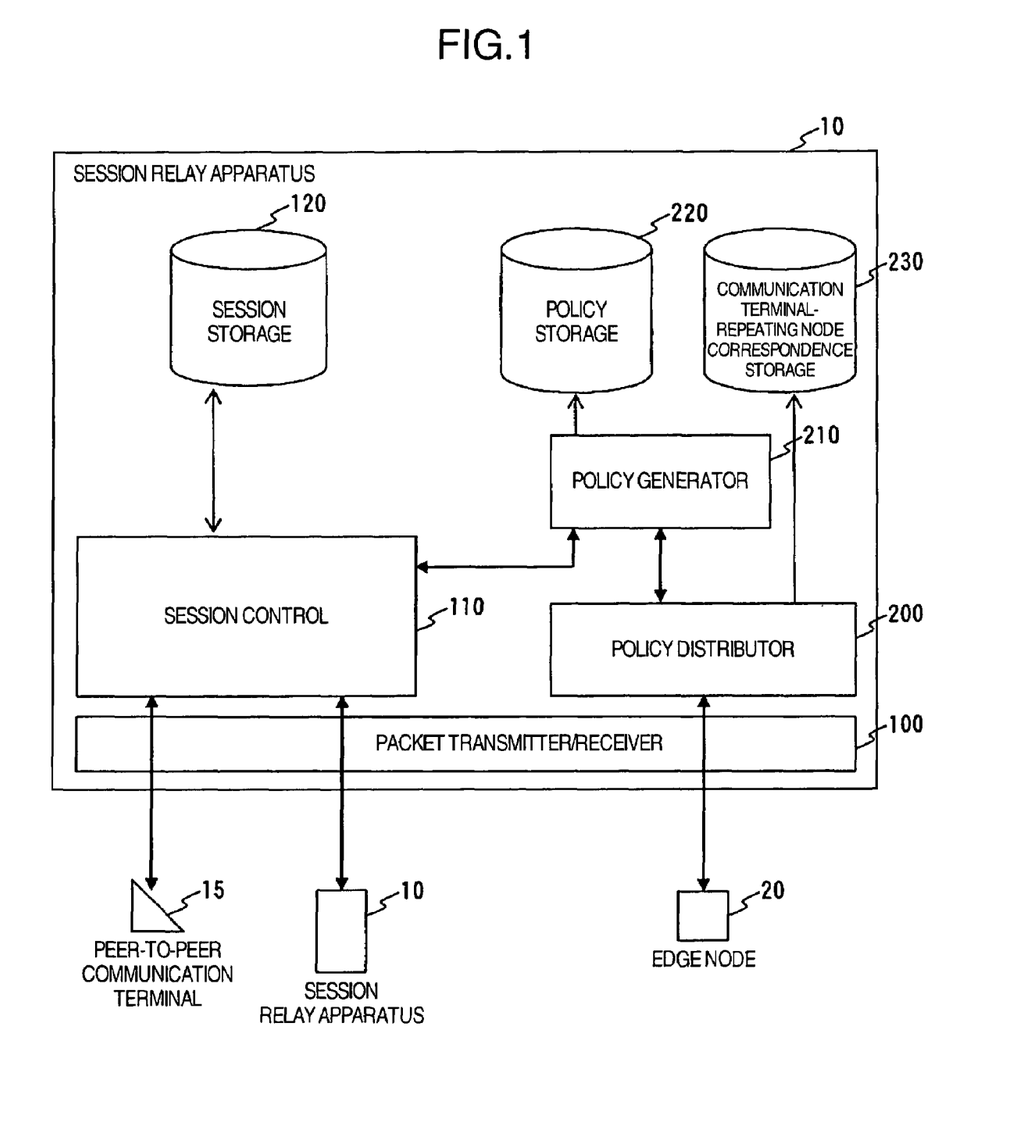
FIG. 1 is a block diagram showing a configuration of a session relay apparatus according to the invention.

FIG. 1 is a block diagram showing a block configuration of a session relay apparatus according to the invention. A session relay apparatus 10 according to the invention comprises a packet transmitter/receiver 100 for transmitting/receiving IP packets, a session control unit 110 for controlling the peer-to-peer communication session, a session storage unit 120 for holding the session status, a policy distribution unit 200 for distributing a policy to edge nodes, a policy generating unit 210 for generating a policy, a policy storage unit 220 for storing the policy generated, and a communication terminal-relay node correspondence storage unit 230 for holding the correspondence between each communication terminal and a corresponding edge node for accommodating the particular communication terminal. In this configuration, the session relay apparatus 10 receives a peer-to-peer communication session control message transmitted from the peer-to-peer communication terminal 15 on the IP network and transfers the peer-to-peer communication session control message to the session relay apparatus 10 for managing a destination communication terminal. The session relay apparatus 10 distributes the policy to the edge node 20 accommodating the communication terminal at the start and end of the session.

Figure 2:
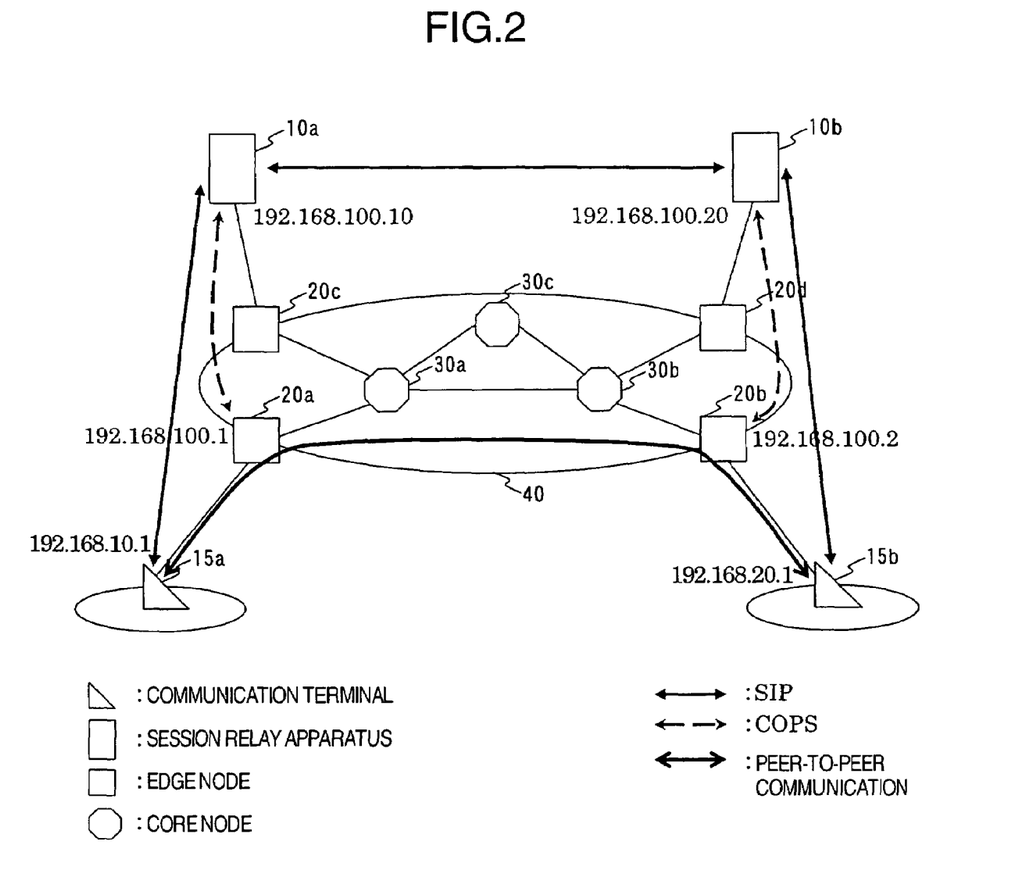
FIG. 2 is a diagram showing an example of a mesh configuration of a communication network using a session relay apparatus according to the invention.

FIG. 2 is a diagram showing a mesh network configuration in which the session relay apparatus according to the invention is used with the IP network of Diffserv as a QoS-controllable IP network. The policy used for the network is not limited to the priority control using the DSCP value based on Diffserv but may be other policies for embodying the invention.

More specifically, a mesh configuration configured of an edge node 20 providing a relay node and a core node 30 and the operation are shown for the peer-to-peer communication with a QoS policy set by the DSCP value between a peer-to-peer communication terminal 15a having an IP address of 192.168.10.1 and a destination communication terminal 15b having an IP address of 192.168.20.1 through an IP network capable of QoS control based on the DSCP value.

Figure 7:
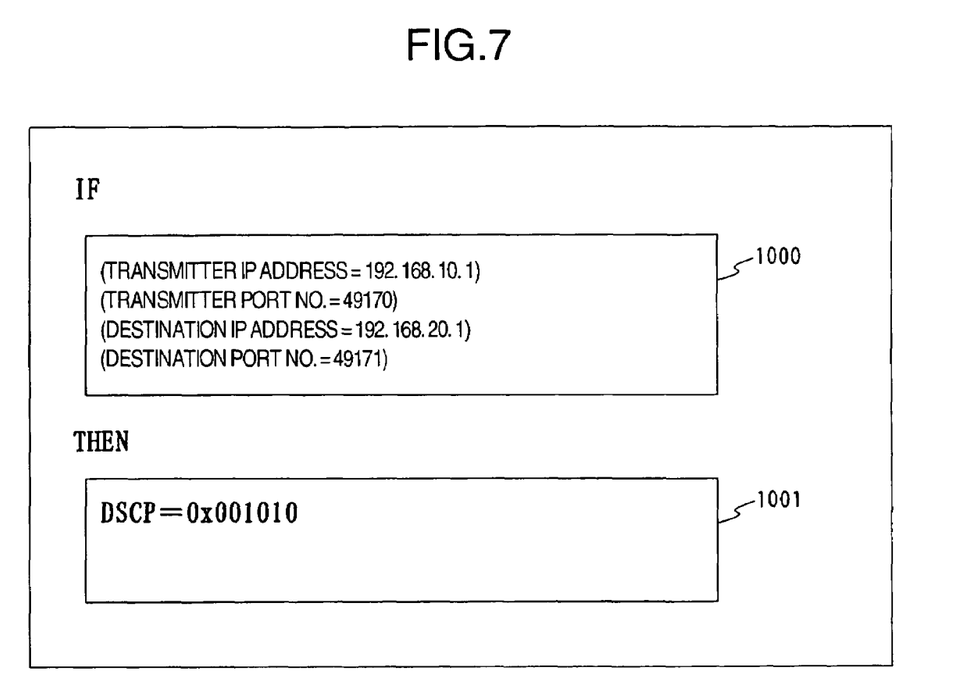
FIG. 7 is a diagram for explaining the contents of the policy generated by the policy generating unit.

In starting the peer-to-peer communication with the communication terminal 15b, the first step is for the communication terminal 15a to transfer a peer-to-peer communication session control message requesting the session relay apparatus 10a having the IP addresses 192.168.100.10 to start the peer-to-peer communication with the communication terminal 15b. The peer-to-peer communication session control message from the communication terminal 15a is transmitted to the communication terminal 15b through the relay apparatus 10a according to the invention and the relay apparatus 10b having the IP address 192.168.100.20 for managing the communication terminal 15b. In the process, the relays apparatus 10a and 10b analyze the peer-to-peer communication session control message individually, and extracting the QoS classification conditions for the peer-to-peer communication, generate a QoS policy for communication between the communication terminals 15a and 15b. The term "the QoS classification conditions", as described later with reference to FIG. 7, is defined as the conditions including the information for identifying a packet determined by the address value and the port number of the packet, and a packet satisfying the conditions is assigned a DSCP value adapted for the particular conditions. The QoS policy generated is set in the edge node 20a of IP address 192.168.100.1 accommodating the communication terminal 15a and the edge node 20b of IP address 192.168.100.2 accommodating the communication terminal 15b. By doing so, these edge nodes are governed by the policy for setting the DSCP value predetermined for the packets meeting the QoS classification conditions.

The session relays apparatus according to the invention and an example of the operation of a communication network (the QoS-controlled peer-to-peer communication operation between the terminals) using the same session relays apparatus is explained below with reference to FIGS. 3 to 9.

Figure 3:
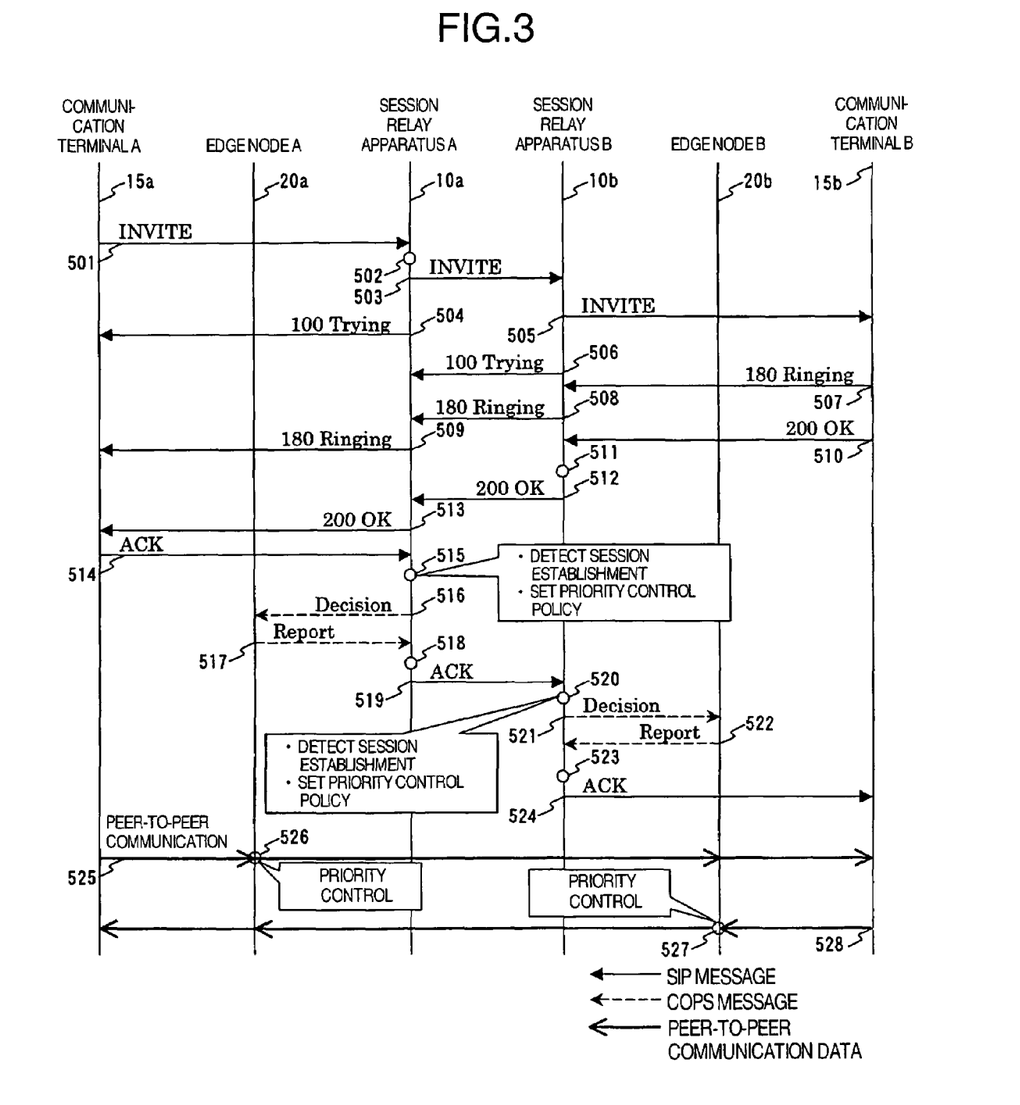
FIG. 3 shows a sequence of the communication steps for starting the peer-to-peer communication.

FIG. 3 is a sequence diagram showing the communication process for the communication terminal A (15a) to start the peer-to-peer communication with the communication terminal B (15b).

Figure 4:
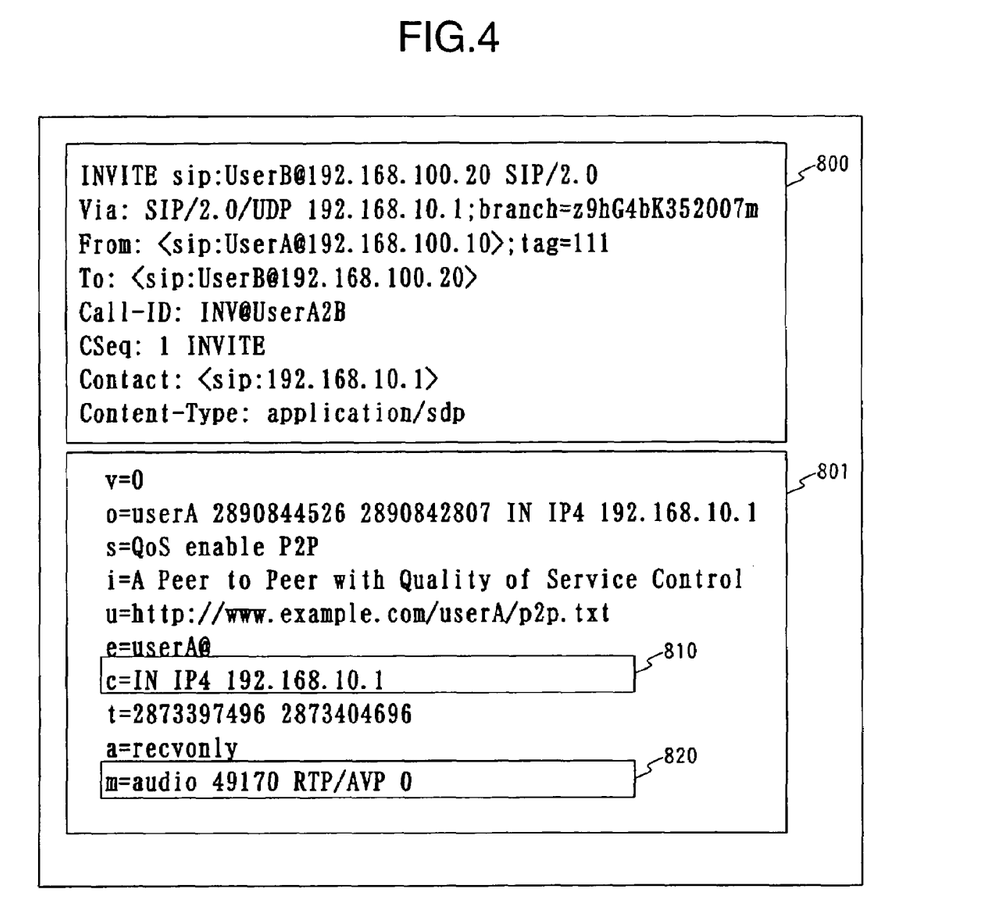
FIG. 4 is a diagram for explaining an example of the session information and the peer-to-peer communication information in the INVITE message.

First, the communication terminal A (15a) sends an INVITE message 501 providing a session control message requesting the session relay apparatus A (10a) to start the peer-to-peer communication with the communication terminal B. FIG. 4 shows the contents of the INVITE message sent from the communication terminal A (10a). The header of the control message provides the session information 800, and the portion stored in the payload of the control message and described by SDP (Session Description Protocol) provides the peer-to-peer communication information 801. As described above, the session information contains information required to uniquely identify the session such as ID information for the communication terminal, and the peer-to-peer communication information contains information required to specify the contents of the peer-to-peer communication such as the communication data type and the protocol used for communication of the particular data type. It is seen from FIG. 4 that the transmitter IP address is 192.168.10.1 (810), the destination port number is 49170 (820), the communication data is audio, and RTP (Realtime Transport Protocol) is used as a communication protocol.

The session relay apparatus A (10a) that has received the INVITE message analyzes the contents of the INVITE message through the session control unit 110, and transfers the INVITE message 503 to the session relay apparatus B (10b), while at the same time responding to the communication terminal A (15a) with a trying message 504 indicating the transfer of the INVITE message. The session control unit 110 also delivers to the policy generating unit 210 the session information 800 and the peer-to-peer communication information 801 stored in the INVITE message. The policy generating unit 210 holds the session information 800 and the peer-to-peer communication information 801 thus delivered (502). In this case, the policy generating unit 210 may hold either the whole or at least the required part of the session information 800 or the peer-to-peer communication information 801. Also, the session control unit 110 may deliver only at least the required part of the session information 800 and the peer-to-peer communication information 801 to the policy generating unit 210.

The session relay apparatus B (10b) that has received the INVITE message from the session relay apparatus A (10a) transfers the INVITE message 505 to the communication terminal B (15b) and responds to the session relay apparatus A (10a) with the trying message 506.

In the case where a ringing message 507 indicating that the communication terminal B (15b) that has received the INVITE message 505 is in preparation for communication is transmitted to the session relay apparatus B (10b) as a response, the session relay apparatus B (10b) transmits a ringing message 508 to the relay apparatus A (10a). The relay apparatus A (10a) that has received this ringing message 508 similarly transmits a ringing message 509 to the communication terminal A (15a).

Figure 11:
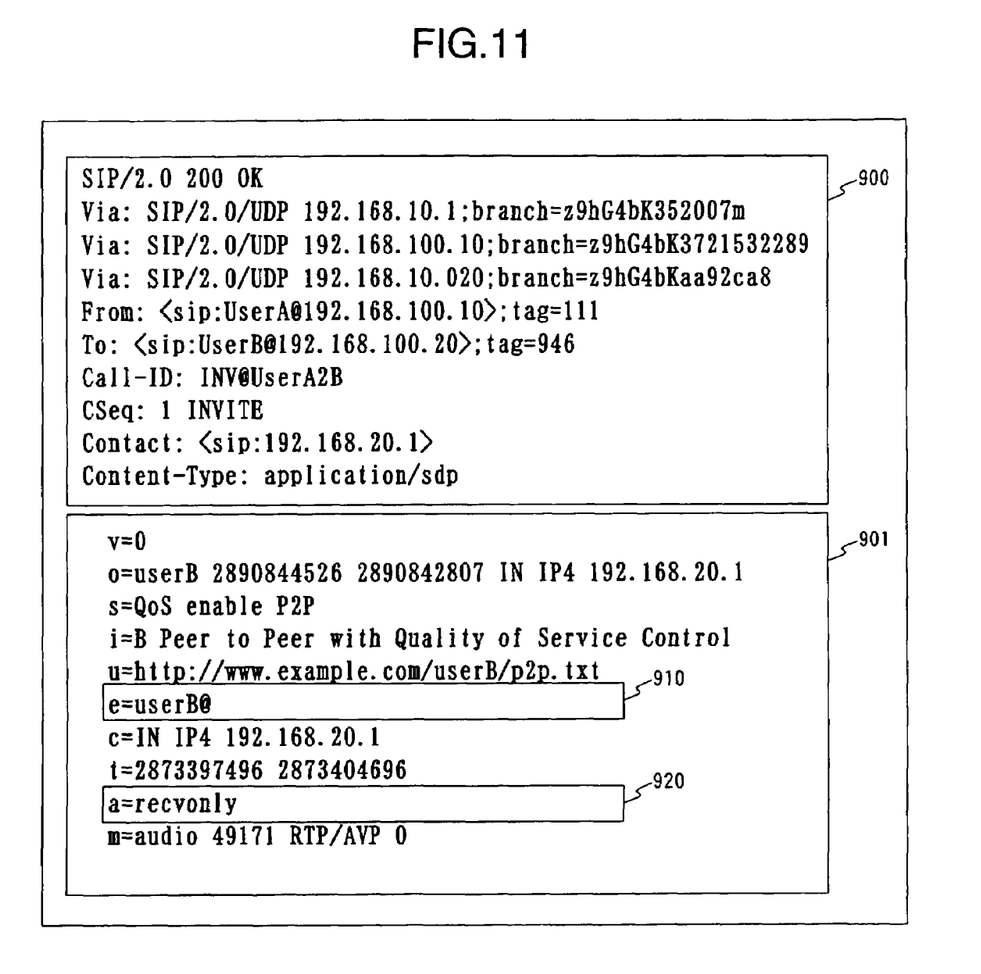
FIG. 11 is a diagram for explaining an example of the session information and the peer-to-peer communication information in the OK message.

Once the preparation for the peer-to-peer communication is over and the communication becomes possible, the communication terminal B (15b) transfers an OK message 510 to the session relay apparatus B (10b). FIG. 11 shows the contents of the OK message 510 transmitted from the communication terminal B (15b). Like the INVITE message shown in FIG. 4, the header of the OK message constituting the session control message based on SIP constitutes the session information 900, under which the portion described by SDP (Session Description Protocol) provides the peer-to-peer communication information 901. FIG. 11 indicates that the destination IP address is 192.168.20.1.820 (910), the transmitter port number is 49171, the communication data is audio, and RTP (920) is used as a communication protocol.

The session relay apparatus B (10b) that has received this OK message 510 extracts, through the session control unit 110, the session information 900 and the peer-to-peer communication information 901 stored in the OK message and delivers them to the policy generating unit 210. The session control unit 110 transfers the OK message 512 to the session relay apparatus A (10a) through the packet transmitter/receiver 100. The policy generating unit 210 that has received the session information 900 and the peer-to-peer communication information 901 from the session control unit 110 holds the same information (511). In the process, the policy generating unit 210 may hold either the whole or at least the required part of the session information 900 or the peer-to-peer communication information 901. Also, the session control unit 110 may deliver either the whole or at least the required part of the session information 900 and the peer-to-peer communication information 901 to the policy generating unit 210.

Upon similar transfer of the OK message 513 to the communication terminal A (15a) from the session relay apparatus A (10a) that has received the OK message 512, the communication terminal A (15a) that has received the OK message transmits an ACK message 514 indicating the start of the peer-to-peer communication to the session relay apparatus A (10a).

Upon receipt of the ACK message 514, the establishment of the session is notified from the session control unit 110 to the policy generating unit 210 in the session relay apparatus A (10a). The policy generating unit 210 that has received this notification registers in the policy management table 220 the session information and the peer-to-peer communication information held therein, while at the same time generating and delivering a QoS policy to a QoS policy distribution unit 200 (515).

Figure 5:
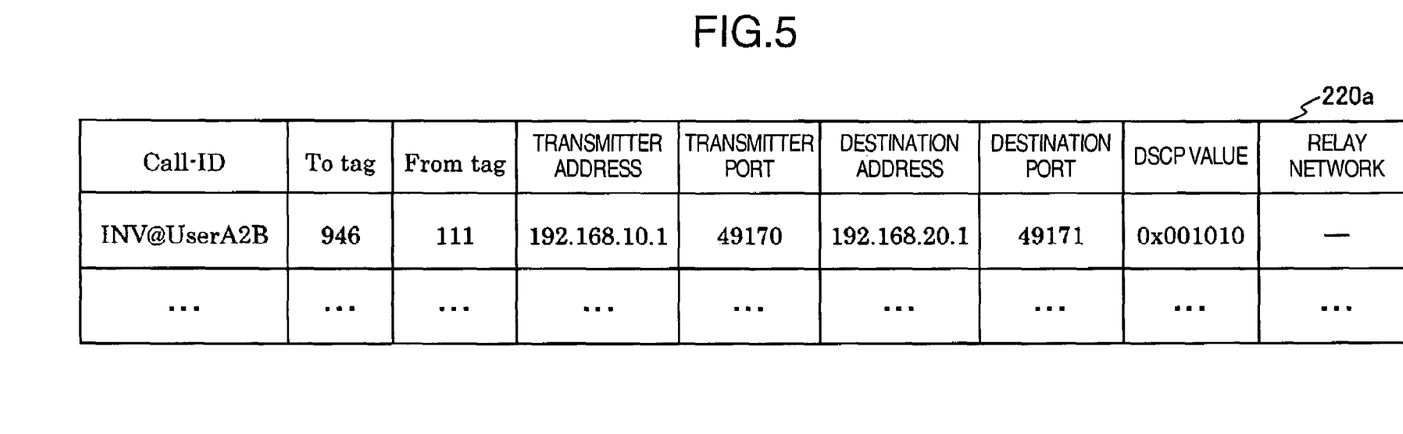
FIG. 5 shows a table structure representing an example configuration of a policy storage unit.

FIG. 5 is a diagram showing a table configuration as an example table configuration of the policy storage unit 220 of the session relay apparatus. Each entry is produced for each peer-to-peer communication, i.e. each time the session is established. The policy storage unit 220 shown in FIG. 5 stores "Call-ID", "To tag" and "From tag" of the session information 800 shown in FIG. 4 for uniquely identifying the session in SIP. Also, the policy storage unit 220 stores the address and the port number of the transmitter and the address and the port number of the destination contained in the peer-to-peer communication information 801 shown in FIG. 4, and further the DSCP value indicating the priority relay control level of packets and the address of the next relay node for selecting a relay network.

FIG. 7 is a diagram for explaining an example of the policy generated by the policy generating unit 210 of the session relay apparatus. The policy is described in PIB (Policy Information Base) format indicating the rules of the conditional operation type according to SPPI (Structure of Policy Provisioning Information). PIB for Diffserv, for example, is laid down in RFC3317. According to the embodiment shown in FIG. 7, the operation (1001) of rewriting the DSCP value as 0x001010 is used for the packet meeting the conditions including the transmitter IP address of 192.168.10.1, the transmitter port number of 49170, the destination IP address of 192.168.20.1 and the destination port number of 49171. In this way, the QoS generated includes the QoS control classification conditions 1001 and the packet processing 1001 under the same conditions. Thus, the DSCP value of the packet with the edge node 20 meeting the conditions is rewritten and the core node 30 executes the packet priority control based on the DSCP value.

The policy distribution unit 200 executes the process of setting the QoS policy generated by the policy generating unit 210, in the edge node 20a using the COPS protocol. For this purpose, the policy distribution unit 200 produces a decision message 516 in accordance with the COPS protocol using the QoS policy delivered from the policy generating unit, searches the communication terminal-relay node correspondence storage unit 230 by way of the transmitter IP address contained in the QoS policy, and transmits the produced decision message 516 to the edge node A (20a) accommodating the communication terminal A (15a). The policy in PIB format is encoded by BER (Basic Encoding Rules) of ASN.1 (Abstract Syntax Notation one) defined in ISO (International Organization for Standardization), and transmitted to the edge node as a decision message.

Figure 6:
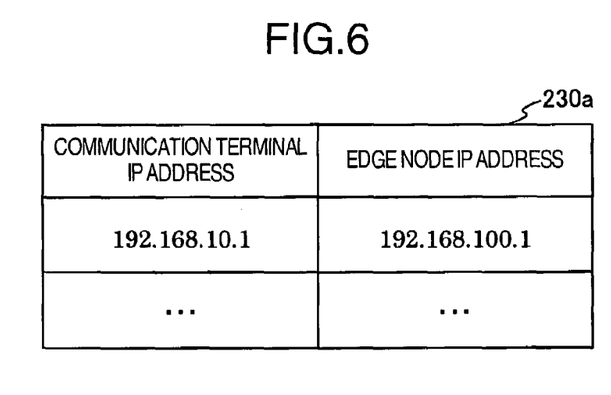
FIG. 6 shows a table structure representing an example configuration of a communication terminal-relay node correspondence storage unit.

FIG. 6 is a diagram showing a table configuration representing an example configuration of the communication terminal-relay node correspondence storage unit 230 of the session relay apparatus. In this example, each entry corresponds to one communication terminal. The communication terminal-relay node correspondence storage unit 230 shown in FIG. 6 includes the IP address of a communication terminal, and the IP address of the edge node accommodating the particular communication terminal. The communication terminal-relay node correspondence storage unit is set manually by the network manager or automatically by communication between the session relay apparatus, the edge node and the communication terminal.

The edge node A (20a) registers by retrieving the QoS control classification conditions and the packet processing from the QoS policy stored in the decision message 516 received on the one hand, and transmits a report message 517 indicating the complete registration as a response to the session relay apparatus A (10a). The session relays apparatus A (10a) that has received the report message 517 transmits an ACK message 519 to the session relay apparatus B (10b) (518).

In the session relay apparatus B (10b) that has received the ACK message, the session control unit 110 notifies the policy generating unit 210 that the session has been established. The policy generating unit 210 that has received this notification registers in the policy storage unit 220 the session information 900 and the peer-to-peer communication information 901 stored therein (520), and in accordance with the COPS protocol, generates and transmits the decision message 521 to the edge node B (20b) accommodating the communication terminal B (10b) through the policy distribution unit 210.

The edge node B (20b) that has received the decision message 521 similarly registers the QoS control classification conditions and the packet processing and transmits a report message 522 to the session relay apparatus B (10b). The session relay apparatus B (10b) that has received this report message transmits an ACK message 524 to the communication terminal B (15b) (523). The receipt of this ACK message by the communication terminal B (15b) indicates that the session is established between the communication terminal A (15a) and the communication terminal B (15b).

By the operation described above, the session is established between the communication terminals and the QoS policy is completely set in the relay network. The communication terminal A (15a) transmits the peer-to-peer communication packet 525, and the edge node A (20a) sets the QoS control class, i.e. the DSCP value of the particular packet (526). In similar fashion, the edge node B (20b) sets the QoS control class for the peer-to-peer communication packet 528 sent from the communication terminal B (15b) (527). In the network 40, the core node 30 executes the packet relay process by priority control in accordance with the order of priority set in the packet.

Figure 8:
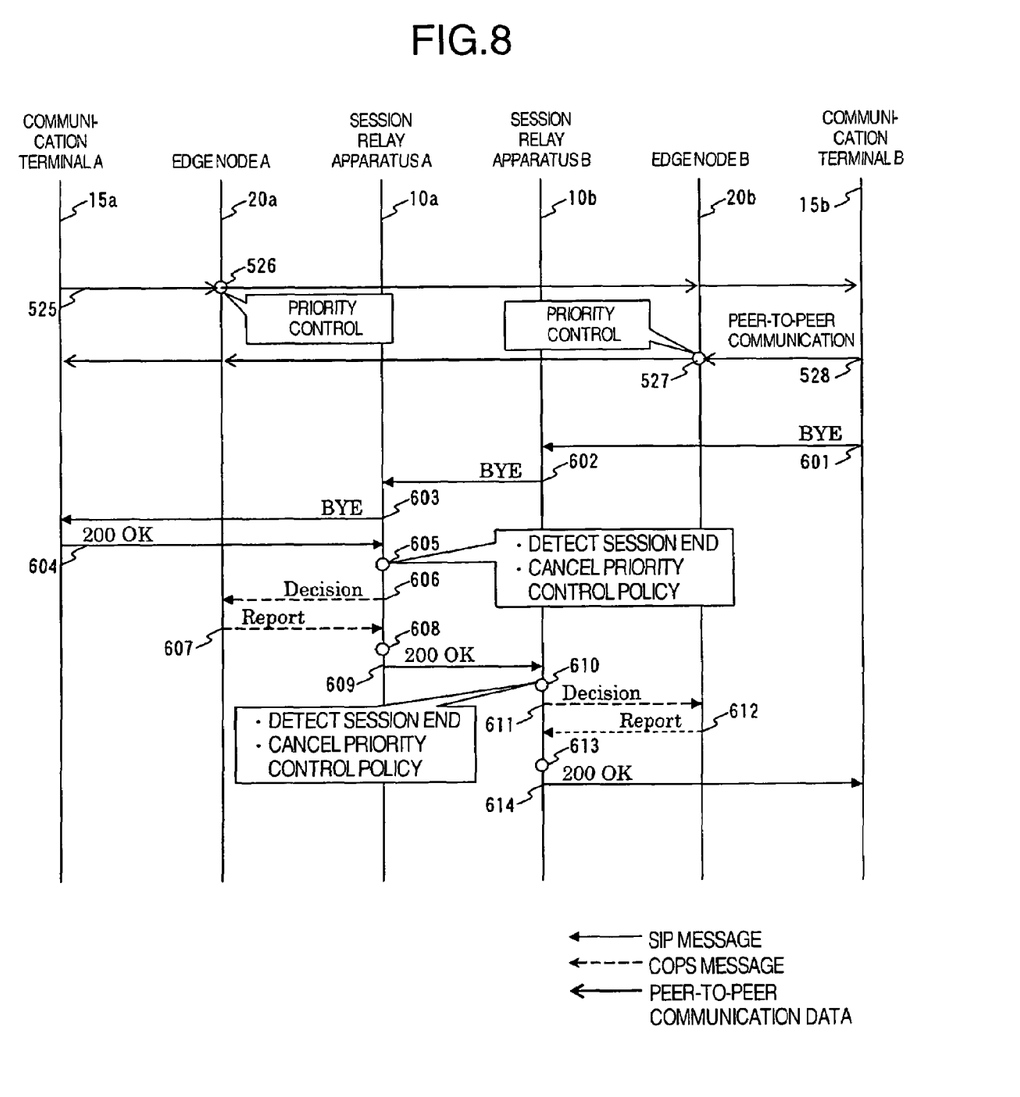
FIG. 8 is a sequence diagram showing the communication steps to end the peer-to-peer communication.

FIG. 8 is a sequence diagram showing the communication process executed in the case where the communication terminal B (15b) terminates the peer-to-peer communication with the communication terminal A (15a). The communication terminal B (15b) transmits a BYE message 601 indicating the end of the session to the session relay apparatus B (10b). The session relay apparatus B (10b) that has received this BYE message further transfers a BYE message 602 to the session relay apparatus A (10a). The session relay apparatus A (10a) that has received this BYE message similarly transfers a BYE message 603 to the communication terminal A (15a). The communication terminal A (15a) that has received the BYE message transmits an OK message 604 to the session relay apparatus A (10a).

In the session relay apparatus A (10a) that has received the OK message, the session control unit notifies the policy generating unit that the session has ended. The policy generating unit 210 that has received this notification searches the policy management table 220 using "Call-ID", "To tag" and "From tag" stored in the OK message, deletes the corresponding entry from the policy storage unit 220, generates the QoS policy indicating the cancellation of the QoS control and delivers the QoS policy to the policy distribution unit 200.

The policy distribution unit 200, using the COPS protocol, executes the process of setting in the edge node 20a the QoS policy generated by the policy generating unit 210. The policy distribution unit 200 that has received the QoS policy indicating the cancellation of the QoS control generates a decision message 606 in accordance with the COPS protocol, searches the communication terminal-edge node correspondence table 230 for the edge node A (20a) accommodating the communication terminal A (15a) and distributes a decision message 606 to the edge node A (20a).

The edge node A (20a) that has received the decision message 606 deletes the corresponding QoS policy setting (608), and sends a report message 607 indicating the complete deletion as a response to the session relay apparatus A (15a).

The session relay apparatus A (10a) that has received the report message 607 transmits an OK message 609 to the session relay apparatus B (10b). In the session relay apparatus B (10b) that has received the OK message, the end of the session is notified from the session control unit 110 to the policy generating unit 210. The policy generating unit 210 that has received this notification deletes the corresponding entry of the policy from the internal policy storage unit 220 based on the information contained in the OK message. The policy distribution unit 200, in order to instruct the edge node 20b to cancel the policy setting, prepares a decision message 611 in accordance with the COPS protocol and sends it to the edge node B (20b) (610).

The edge node B (20b) that has received the decision message 611 deletes the QoS policy setting and transmits a report message 612 to the session relay apparatus B (10b). The session relay apparatus B (10b) that has received this report message transmits an OK message 614 to the communication terminal B (20b) (613). Through these steps, the peer-to-peer communication is terminated and the corresponding QoS control is canceled.

Figure 9:
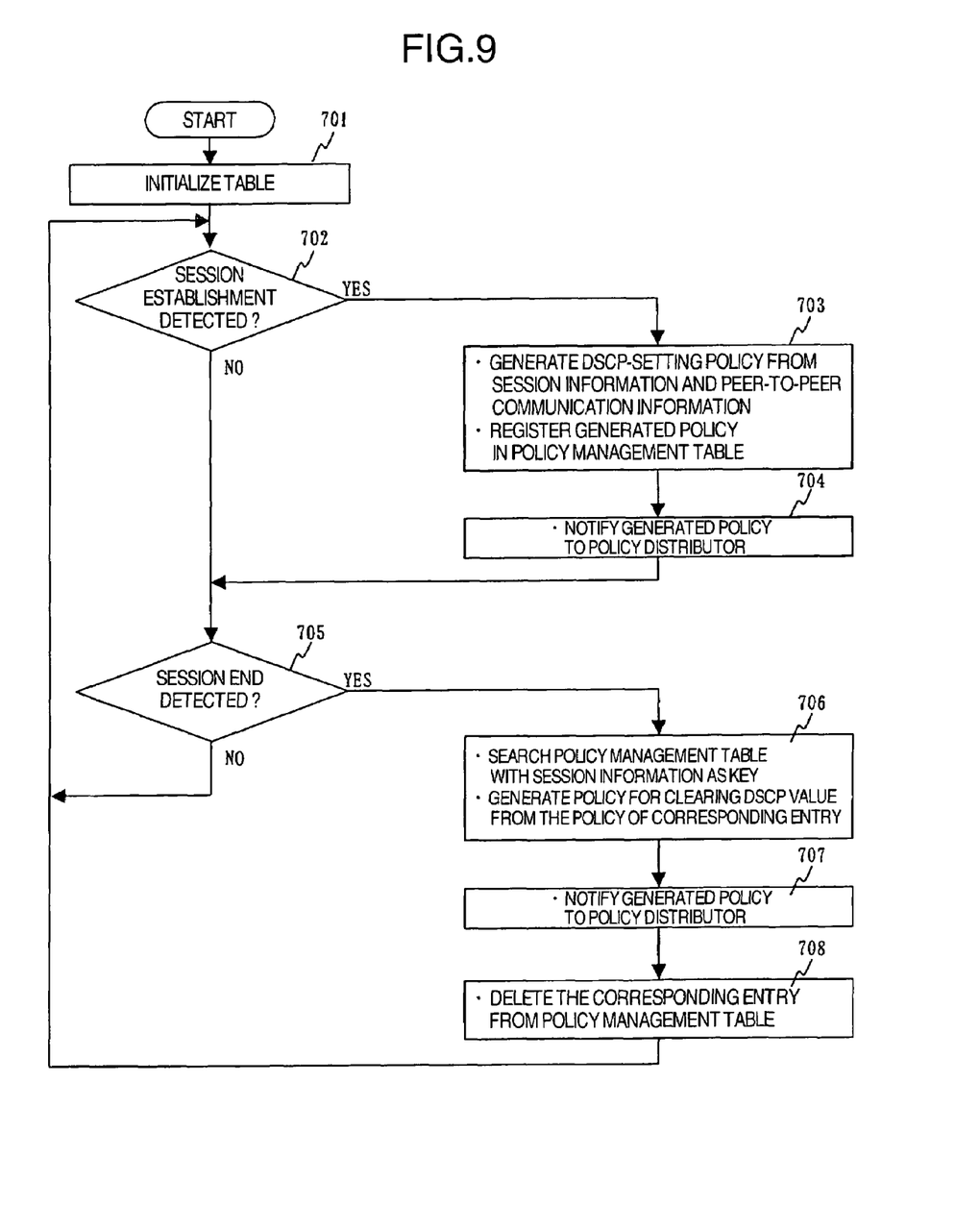
FIG. 9 is a flowchart for explaining the operation of the policy generating unit.

FIG. 9 is an operation flowchart showing the process executed by the policy generating unit 210 included in the session relay apparatus 10 according to the invention. The policy generating unit 210 initializes the policy storage unit 220 at the time of starting and then repeatedly executes the following-described process.

The policy generating unit 210 first checks whether the establishment of a session has been detected or not. One method of detecting the session establishment consists in the notification from the session control unit 110. Upon detection of the session establishment, the policy generating unit 210 generates a policy for setting the DSCP value, from the session information and the peer-to-peer communication information in the INVITE message providing the session control message. The policy generating unit 210 registers the generated policy in the policy storage unit 220, and through the policy distribution unit 200, sets a policy in the edge node 20 according to the COPS protocol.

In the case where the session is not established or after the aforementioned process is executed upon detection of the session establishment, the policy generating unit 210 checks whether the end of the session has been detected or not. One method of detecting the end of a session consists in the notification from the session control unit 110. Upon detection of the end of a session, the policy generating unit 210 searches the policy storage unit 220 with the session information in the OK message providing the session control message as a key. The policy generating unit 210 generates a policy for clearing the DSCP value using the entry of the search result, and through the policy distribution unit 210, cancels the policy setting in the edge node 20 according to the COPS protocol. The corresponding entry of the policy storage unit 220 is deleted subsequently by the policy generating unit 210.

Figure 10:
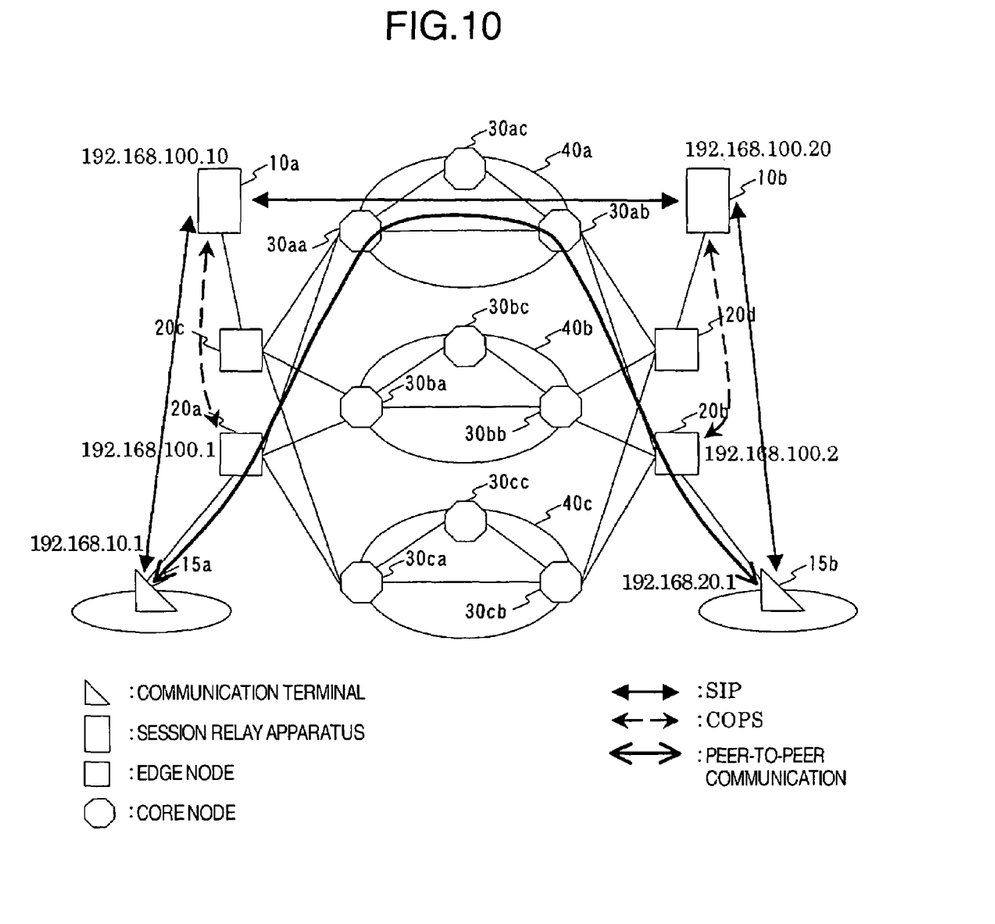
FIG. 10 shows a mesh configuration as another configuration of the communication network using the session relay apparatus according to the invention.

FIG. 10 shows a mesh configuration of the network using the session relay apparatus 10 according to the invention as a communication network with a selectable relay network. Networks 40a, 40b, 40c exist as relay networks. The band of each network can be secured by selecting a relay network in accordance with the type of the peer-to-peer communication data. In the case where the relay network designated by numeral 40a is selected by policy setting, for example, the address of the relay node 30aa connected to the relay network 40a is registered in the "relay network" item of the policy storage unit 220 shown in FIG. 5. As a result, the session relay apparatus 10a transfers to the relay node 30aa those packets received from the communication terminal 15a which meet the required conditions, and transmits them through the relay network 40a to the communication terminal 15b. This embodiment is effectively applicable to a case in which with different policies preset in the networks 40a, 40b and 40c, for example, a network using a policy conforming with the packet transmitted from the communication terminal A 15a to the communication terminal B 15b is selected.

It will thus be understood from the foregoing description that according to this invention, the start and end of the policy settable peer-to-peer communication are detected by a session relay apparatus, so that a policy can be set in each edge node accommodating a communication terminal at the start of communication, while the policy setting can be canceled at the end of communication. Also, the need of the policy-setting operation by the operator is eliminated, thereby making it possible to prevent the packet relay delay which otherwise might occur in an edge node by the unrequited policy setting.

Embodiments of the invention are described above. Nevertheless, this invention is not limited to these embodiments, but as obvious to those skilled in the art, can be variously modifiable within the scope of the appended claims without departing from the spirit of the invention.

What is claimed is:

1. A peer-to-peer communication system comprising:
    session relay apparatuses which relay session control messages used for peer-to-peer communication between communication terminals;
    edge nodes, in a network coupling the communication terminals, accommodating the communication terminals to the network; and
    a core node which executes a packet relay process in the network,
    wherein a first session relay apparatus receives a session control message from a first communication terminal and a second session relay apparatus receives a session control message from a second communication terminal;
    wherein when the first session relay apparatus receives a session establishment request from the first communication terminal as a communication source:
    the first session relay apparatus transfers the session establishment request to the second session reply apparatus;
    the second session relay apparatus transfers the session establishment request to the second communication terminal;
    if the second communication terminal is available to communicate, the second communication terminal transfers a message representing that the communication is available, to the second session relay apparatus;
    after the second session relay apparatus transfers the message representing that the communication is available, to the first session relay apparatus, the first session relay apparatus generates a packet relay processing policy for a peer-to-peer communication packet, distributes the policy to a first edge node accommodating the first communication terminal, and causes the first edge node to register the policy, and the second session relay apparatus generates a packet relay process policy to the peer-to-peer communication packet, distributes the policy to a second edge node accommodating the second communication terminal, and causes the second edge node to register the policy to finish a policy setting process to the edge nodes; and
    the peer-to-peer communication packet from the first communication terminal is set for a next relay node based on the policy in the first edge node to select a network to be relayed,
    wherein if the second session relay apparatus receives a session end request from the second communication terminal:
    the second session relay apparatus transfers the session end request to the first session relay apparatus;
    the first session relay apparatus transfers the session end request to the first communication terminal; and
    after the first communication terminal transfers an OK message to the first session relay apparatus in response to the session end request, the first session relay apparatus causes the first edge node accommodating the first communication terminal to delete the policy distributed to the first edge node and the second session relay apparatus causes the second edge node accommodating the second communication terminal to delete the policy distributed to the second edge node,
    wherein upon receiving a session establishment request, the session relay apparatuses refer to the session establishment request, generate a packet relay processing policy including information for uniquely identifying a session, and manage a packet relay processing policy per session, and
    wherein upon receiving an OK message, the session relay apparatuses search a packet relay processing policy based on the information for uniquely identifying the session, and delete the packet relay processing policy related to the received OK message.

2. The peer-to-peer communication system according to claim 1, wherein the information for uniquely identifying the session is generated based on the session establishment request.

3. The peer-to-peer communication system according to claim 1, wherein the information for uniquely identifying the session is included in the session establishment request.

4. The peer-to-peer communication system according to claim 1, wherein the information for uniquely identifying the session is Call-ID, To-tag and From-tag.

* * * * *